(No Model.)
H. B. BOYD.
PNEUMATIC TIRE.
No. 500,468. Patented June 27, 1893.
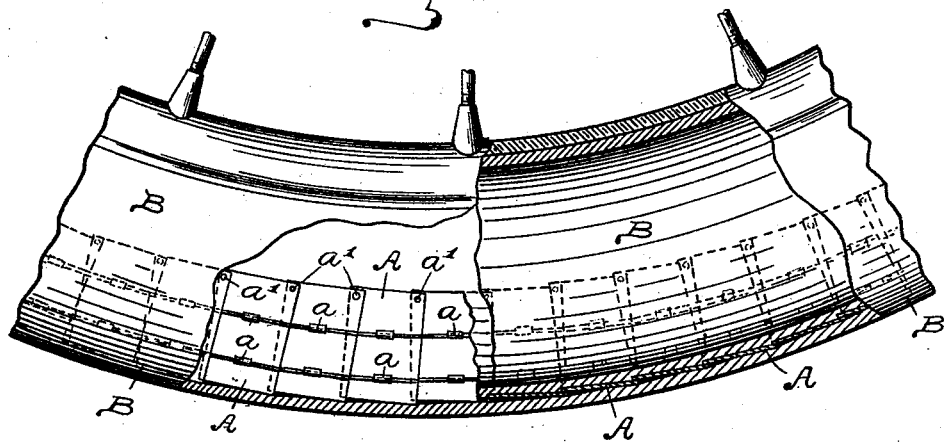
Fig. 1.
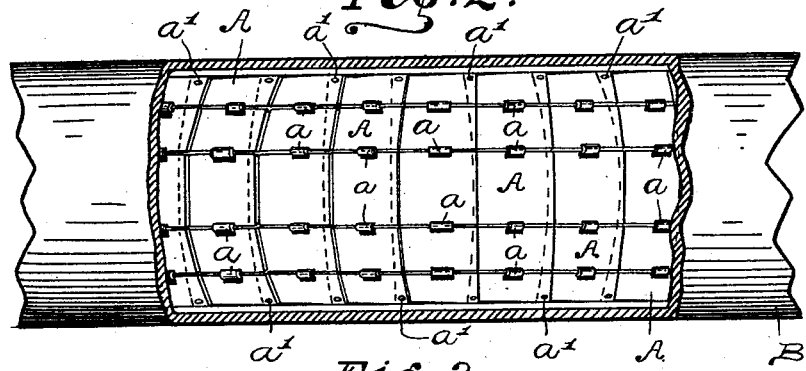
Fig. 2.
Fig. 3.
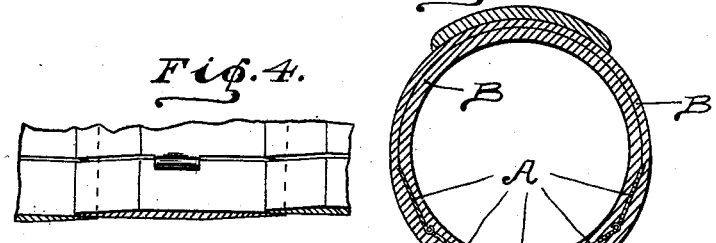
Fig. 4.
WITNESSES:
F. W. Warner
J. A. Walsh
INVENTOR
Horace B. Boyd,
per Chester Bradford,
ATTORNEY.

UNITED STATES PATENT OFFICE.

HORACE B. BOYD, OF CAMBRIDGE CITY, ASSIGNOR OF ONE-HALF TO LAWSON A. BOYD, OF INDIANAPOLIS, INDIANA.

PNEUMATIC TIRE.

SPECIFICATION forming part of Letters Patent No. 500,468, dated June 27, 1893.

Application filed February 7, 1893. Serial No. 461,299. (No model.)

*To all whom it may concern:*

Be it known that I, HORACE B. BOYD, a citizen of the United States, residing at Cambridge City, in the county of Wayne and State of Indiana, have invented certain new and useful Improvements in Pneumatic Tires, of which the following is a specification.

The object of my said invention is to produce a complete and effective means of protecting bicycle and other pneumatic tires from puncture.

Said invention consists in a series of metal plates linked and hinged together in such a manner as to not materially interfere with the usual flexibility and elasticity of the tire, while at the same time entirely protecting from puncture that portion of the tire which is subject to contact with sharp or angular substances in use.

Said invention will be first fully described and then pointed out in the claims.

Referring to the accompanying drawings, which are made a part hereof, and on which similar letters of reference indicate similar parts, Figure 1 is a view partly in section and partly in side elevation of a bicycle tire provided with my said invention; Fig. 2, an under side plan view of the same with the outer surface or cover broken away to show the metal plates; Fig. 3, a transverse sectional view of said tire; and Fig. 4, a detail view showing the construction of the links or plates more plainly.

In said drawings the portions marked A represent metal plates of which my improved protector is composed, and B the ordinary hollow tire, preferably and usually formed of rubber.

The metal sections A are first made up in strips connected by hinges $a$, which strips are of sufficient length to extend sufficiently around the tire to serve the purpose of a protector,—usually about one-third its circumference. These strips when thus formed are united together at the extreme outer corners by pivots $a'$. The hinges $a$ permit the tire to flatten as it comes in contact with the surface over which it is traveling in one direction, while the pivots $a$ permit the sections composed of several plates to slide in and out upon each other, thus permitting said tire to flatten in the other direction. The whole being laid between the two thicknesses of rubber usually composing the tire, whenever said tire comes in contact with any sharp substance, or anything capable of penetrating it, said substance or article can only penetrate the outer thickness of the rubber, when it will come against one of these metal plates, preventing its further penetration, and the inner thickness of rubber will remain unpunctured and whole, and thus efficiently retain the air which has been forced into it.

The edges of the plates may be tapered somewhat as shown in Fig. 4, and this I regard as a preferred construction, as it makes the structure as a whole smoother, as will be readily understood.

In placing my shield in place, I prefer to first attach it securely to cloth, and then secure the cloth to the rubber, but I do not desire to confine myself to such details of construction.

Having thus fully described my said invention, what I claim as new, and desire to secure by Letters Patent, is—

1. In a pneumatic tire, a shield composed of a series of metal plates hinged together in strips, and the strips pivoted together at their ends, whereby the shield as a whole is capable of flexible movement both longitudinally and transversely, substantially as set forth.

2. A pneumatic tire composed of rubber, with a metal shield between the inner and outer portions of the rubber, which shield is composed of metal plates hinged and pivoted together, substantially as and for the purposes set forth.

3. A shield for use in forming pneumatic tires consisting of metal plates, said plates being first hinged together in strips, which strips in use run circumferentially of the tire, and said strips being connected together by pivots at the extreme outer edges of the whole structure, said shield as a whole extending circumferentially of the wheel, substantially as set forth.

4. A shield for use in forming pneumatic tires consisting of metal plates hinged and pivoted together as described, the several plates being tapered toward the edges where they overlap each other in the manner shown, thus contributing to the smoothness of the structure as a whole, substantially as set forth.

In witness whereof I have hereunto set my hand and seal, at Indianapolis, Indiana, this 1st day of February, A. D. 1893.

HORACE B. BOYD. [L. S.]

Witnesses:
CHESTER BRADFORD,
JAMES A. WALSH.